(No Model.) 5 Sheets—Sheet 3.
G. W. TAFT & E. L. LATHROP.
MACHINE FOR MAKING, REPAIRING, AND CLEARING ROADS.
No. 411,939. Patented Oct. 1, 1889.
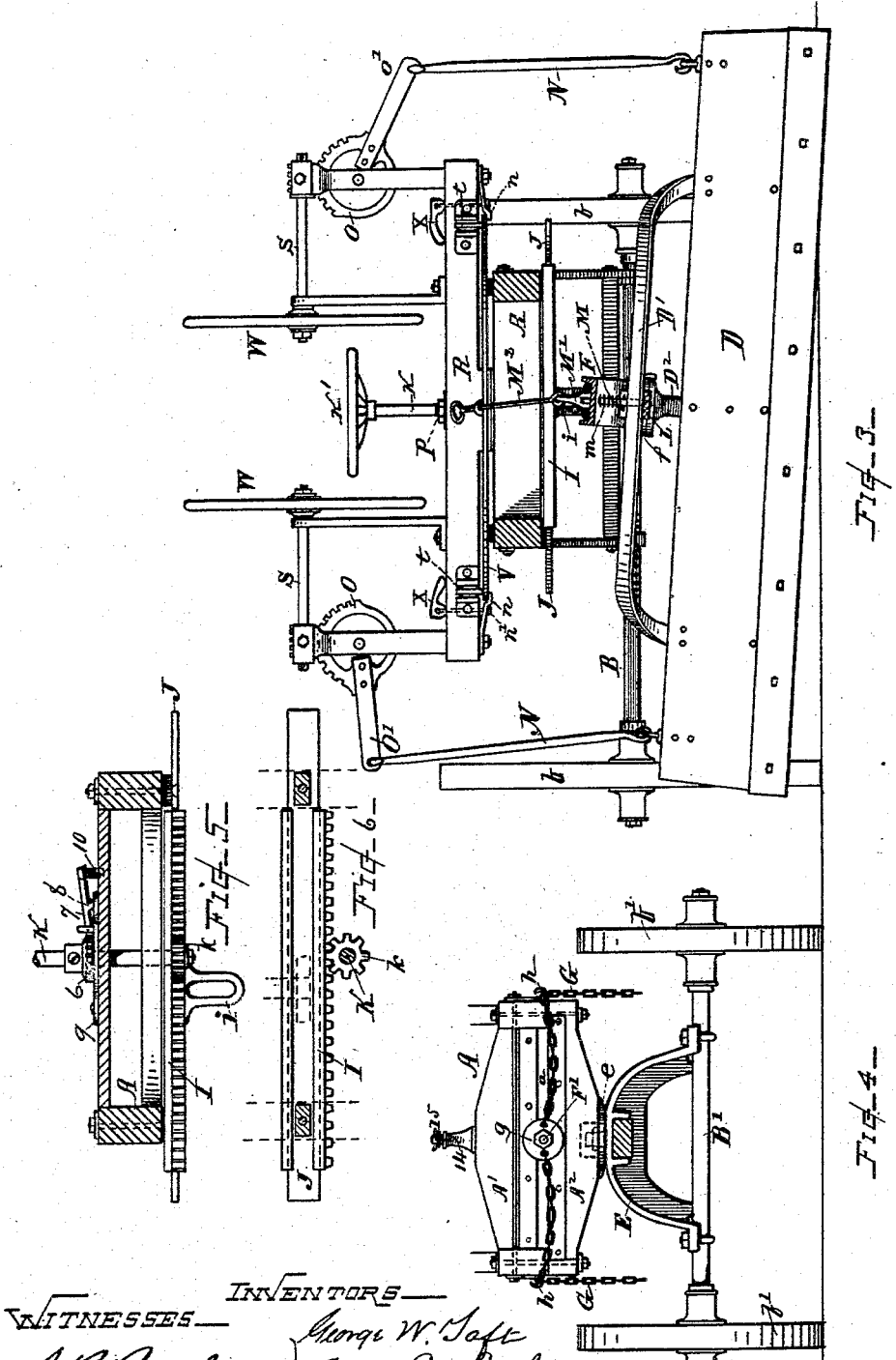

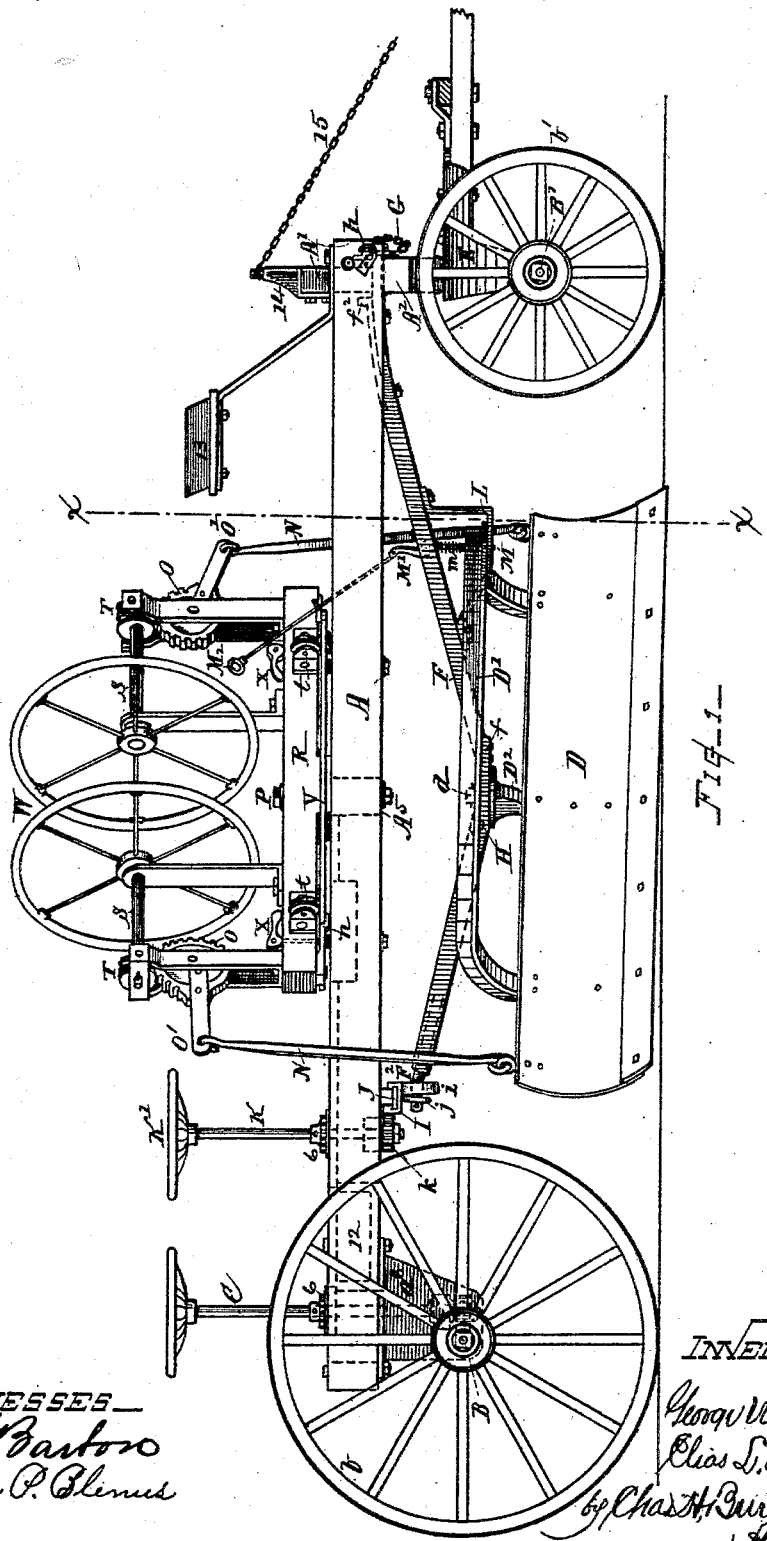

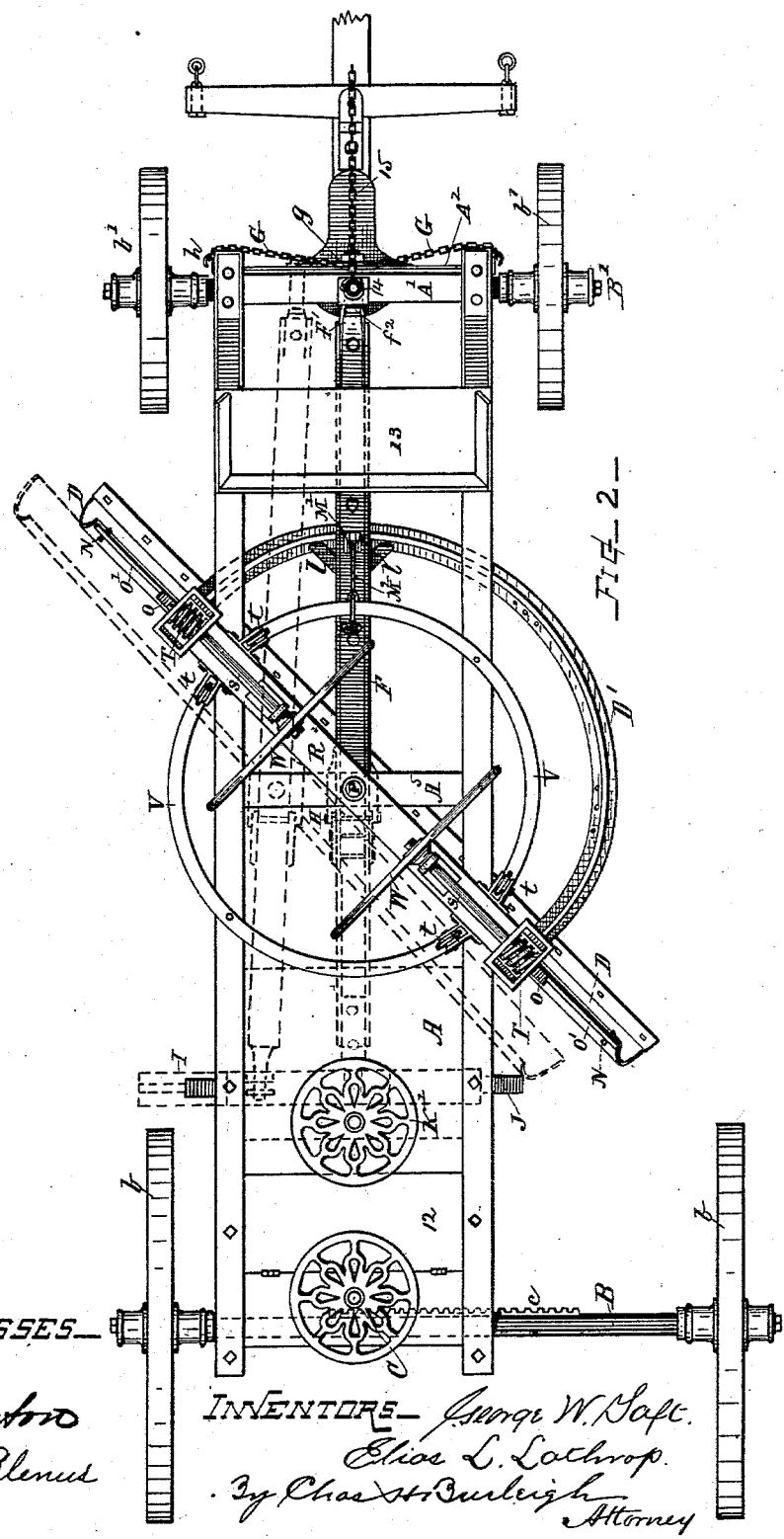

(No Model.) 5 Sheets—Sheet 4.
G. W. TAFT & E. L. LATHROP.
MACHINE FOR MAKING, REPAIRING, AND CLEARING ROADS.
No. 411,939. Patented Oct. 1, 1889.
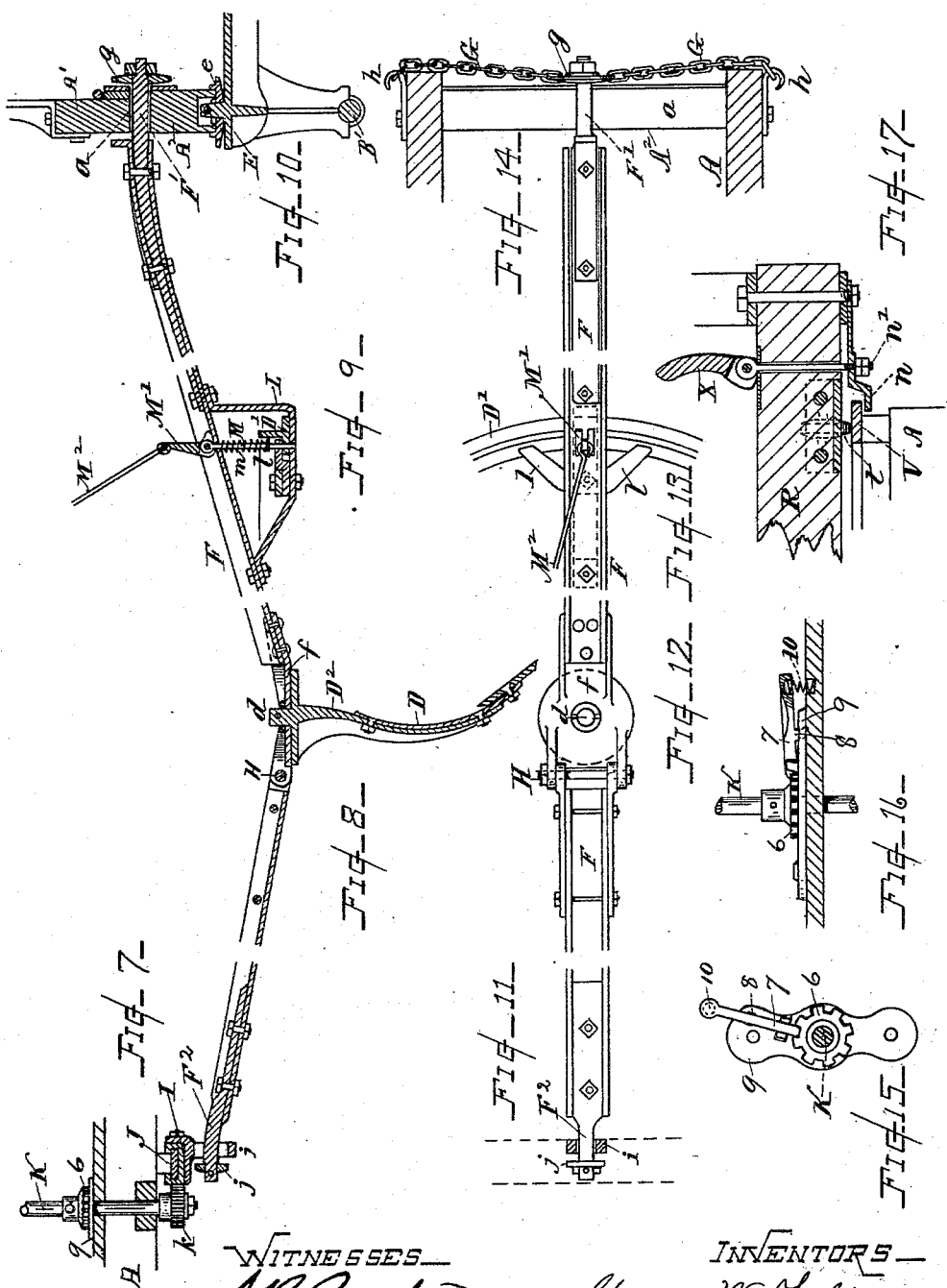

(No Model.) 5 Sheets—Sheet 5.
G. W. TAFT & E. L. LATHROP.
MACHINE FOR MAKING, REPAIRING, AND CLEARING ROADS.
No. 411,939. Patented Oct. 1, 1889.
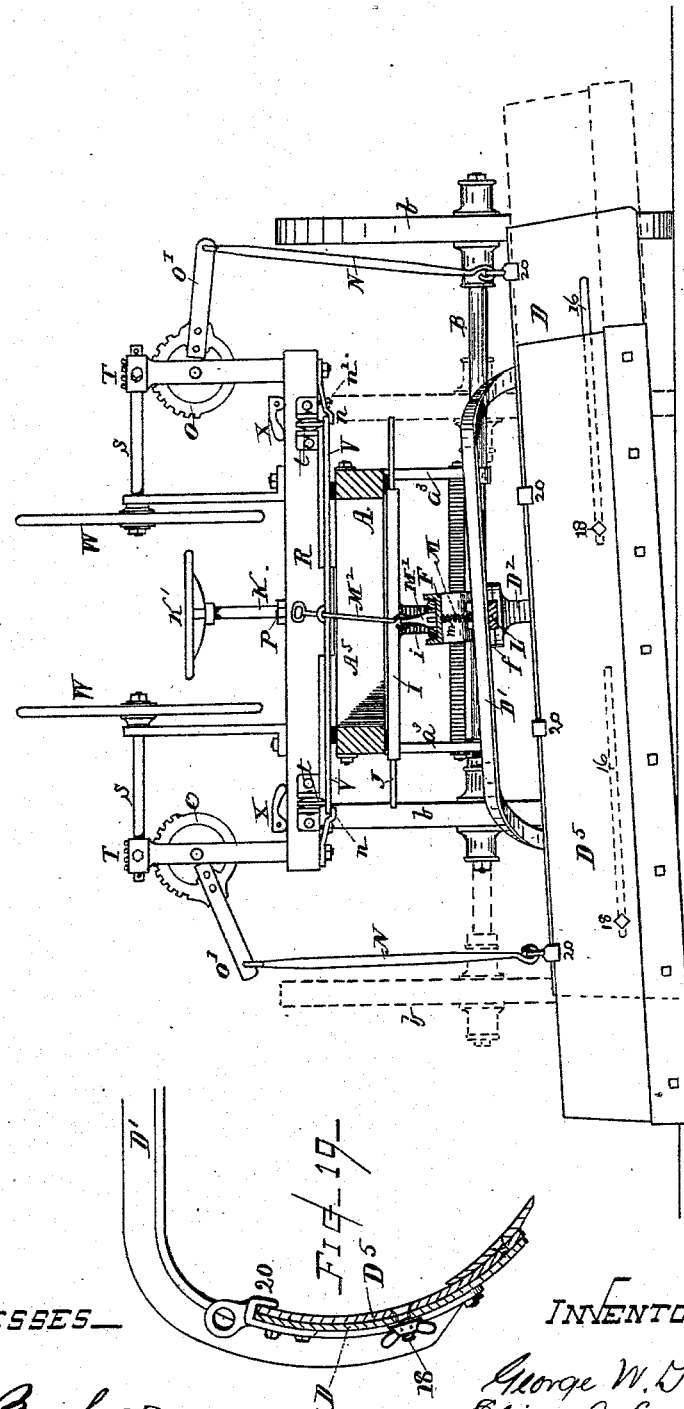

UNITED STATES PATENT OFFICE.

GEORGE WARNER TAFT, OF KENNETT SQUARE, PENNSYLVANIA, AND ELIAS L. LATHROP, OF FORT WAYNE, INDIANA, ASSIGNORS TO THE AMERICAN ROAD MACHINE COMPANY, OF KENNETT SQUARE, PENNSYLVANIA.

MACHINE FOR MAKING, REPAIRING, AND CLEARING ROADS.

SPECIFICATION forming part of Letters Patent No. 411,939, dated October 1, 1889.

Application filed April 10, 1889. Serial No. 306,688. (No model.)

*To all whom it may concern:*

Be it known that we, GEORGE WARNER TAFT and ELIAS L. LATHROP, both citizens of the United States, the former residing at Kennett Square, in the county of Chester and State of Pennsylvania, and the latter at Fort Wayne, in the county of Allen and State of Indiana, have invented certain new and useful Improvements in Machines for Making, Repairing, and Clearing Roads, of which the following, together with the accompanying drawings, is a specification sufficiently full, clear, and exact to enable persons skilled in the art to which this invention appertains to make and use the same.

The objects of our present invention are to produce a practical, efficient, and desirable road-machine that can be economically manufactured, and which can be operated conveniently and successfully under the varying conditions and requirements of actual service; also, to provide in a machine for the purpose specified improved means for effecting adjustment of the scraper and for controlling the action of the mechanism while in use, as will be more fully explained, the particular features of improvement and subject-matter claimed being hereinafter definitely specified.

In the drawings, Figure 1 is a side view of a road-machine constructed in accordance with our invention. Fig. 2 is a plan view of the same. Fig. 3 is a transverse vertical section at line $x\ x$ from the front. Fig. 4 is a view of the front end. Fig. 5 is a transverse section of the body, showing the slide for supporting and adjusting the rear end of the reach or scraper draft-bar. Fig. 6 is a plan view of the slide, its support, and actuating-pinion. Fig. 7 is a vertical section through the slide, its supporting-bar, and rear end of the reach. Fig. 8 is a vertical section through the scraper, pivot, and the hinge of the reach. Fig. 9 is a vertical section through the semicircle, reach, and locking device. Fig. 10 is a vertical section through the front end of the carrying-frame and rocker-beam, showing the connection of the reach or draft-bar and the pivot-connection with the pole-attaching plate. Figs. 11, 12, 13, and 14 are plan views showing details of construction of the reach-bar and its connections corresponding with the four previous figures. Figs. 15 and 16 show details of the locking device for the hand-wheel shafts of the reach-adjusting slide and the adjusting rear axle. Fig. 17 shows the detail of the device for locking the swing-beam. Fig. 18 is a transverse section at line $x$, showing the scraper with an auxiliary adjustable blade. Fig. 19 is a vertical section of the adjustable auxiliary blade and its holding devices.

In our improved road-machine the scraper and its operating mechanism is mounted on a carrying frame or body A, supported on front and rear axles B B' with traveling wheels $b\ b'$. Said carrying-frame consists, preferably, of two longitudinal bars framed together with suitable transoms at the two ends and at the center. The rear end of the carrying-frame is supported by brackets $a^3$ upon the rear axle B, which axle is preferably longitudinally adjustable through said support-brackets, and arranged to be shifted endwise by means of the toothed rack $c$ and a pinion on the hand-wheel shaft C, as before practiced. The front transom A' and rocker-beam $A^2$ are so placed as to afford a long slot or open space $a$, extending laterally across the body between them. Said rocker-beam is provided with an eye-plate $e$, and is supported upon the front axle B' by the pole-attaching plate E. The pintle-boss of the pole-attaching plate passes up through the eye-plate $e$ and forms the draft-connection between the front running-gear and the front end of the body or carrying-frame, as shown.

The scraper bar or blade D has for its draft a semicircle D', fixed thereto, the ends of said semicircle being curved downward at the rear of the blade, and secured thereto. The scraper-blade also has a central standard $D^2$, which is pivoted by a vertical axial stud $d$, with a bearing-plate $f$, fixed to a reach or draft bar F, that has its forward end F' retained and adjustable within the lateral slot $a$ between the rocker-beam $A^2$ and front transom A' of the body. The end F' of the reach-bar that extends through the slot $a$ is provided at the front with a broad washer, draft-head, or plate $g$, held thereon by a nut or other efficient fastening. This head or plate prevents the end of the reach from being drawn back through the slot.

Metal re-enforce plates can be fixed to the transom and rocker-beam to take the wear and strain of the draft-plate $g$. Chains G are connected with the plate $g$, which chains extend to the right and left therefrom, and hitch onto dogs or hooks $h$, fixed at the outer angles of the frame.

The front end of the reach-bar F can be adjusted and retained at any position between the side bars of the carrying-frame by connecting the chains at their different links to the hooks $h$ or by letting out one chain and taking up the other, as will be fully understood from inspection of the drawings. A lug $f^2$ is arranged on the reach-bar at the back of the front transom A' to prevent the reach from being forced forward through the slot $a$. The rear end $F^2$ of the reach F is retained within a loop $i$, fixed to and depending from a laterally-adjustable slide plate or bar I. The slide is best provided with a toothed rack, and works on a lateral guide-bar J, fixed on the under side of the carriage-frame A, which meshes with a pinion $k$, attached to the lower end of an upright shaft K, carrying on its upper end a hand-wheel K', by means of which the slide $i$ and the rear end of the reach F can be moved or adjusted for carrying the scraper D more or less laterally in relation to the frame.

The reach-bar F is provided with a transverse horizontal joint or hinge H in rear of and adjacent to the blade-pivot $d$, which hinge permits of the scraper being raised and depressed, while the ends of the reach remain at the same level in relation to the body-frame. The rear end $F^2$ or tail of the reach-bar passes through the loop $i$ of the slide I, and is provided with a washer or plate $j$, with a nut or fastening-pin for retaining the same in loose connection therewith.

The semicircle D', which is best made of a T-shaped bar bent to proper shape, is retained in connection with the reach or draft bar by a brace L, which passes under the semicircle, the latter being retained from lifting therefrom by outwardly-inclined fingers or plates $l$, fixed on the brace, and which extend over the flange and retain the semicircle in position, while it is free to swing around on the pivot-axis of the scraper. A locking-bolt M is arranged through the reach, and to pass down into notches or holes formed in the semicircle for retaining the scraper at position of oblique adjustment. Said locking-bolt is provided with a spring $m$, and its upper end with a lifting fork or cam M', that is worked by a handle-rod $M^2$, for throwing the bolt M into and out of engagement with the circle. The reach-bar and scraper are free to rock or to move from side to side, both ends of the reach-bar being laterally adjustable, so that the entire reach, together with the scraper-blade and its semicircle, can be carried more or less toward either side of the machine, as may be desired. (See dotted lines, Fig. 2.)

The ends of the scraper D are respectively connected by rods N to the lifting-arm O', having geared heads O, that are journaled in standards at the respective ends of a swing-beam R, which is centrally pivoted at P to the middle transom $A^5$ of the body or carrying-frame. Upon this swing-beam R there are also supported, by suitable bearing-standards, operating-shafts S, carrying at their inner ends the hand-wheels W, and at their outer ends worm-screws T, that engage with the gears O and serve for raising and depressing the arms O' and lifting-rods N, together with the ends of the scraper-blade, when the hand-wheels W are rotated.

The swing-beam is supported by truck-wheels $t$ on a circular traverse way or track V, mounted upon the body-frame, as indicated. Said truck-wheels are journaled in suitable bearing-brackets fixed to the beam, and are arranged in a manner to follow the curve of the traverse-circle.

The circular plate or track is elevated slightly above the top of the body-frame, and at either end of the beam there is provided a clamping-plate $n$, that extends under the track-plate V, and is connected by a rod $n'$ with a cam-lever X, by means of which the clamp-plate $n$ can be caused to grip the track for holding the swing-beam fixed at any position of adjustment, or by raising the cam-lever effect the release of the plate to permit the swinging of the beam and adjusting mechanism upon its axial center. The clamping device is shown in detail in Fig. 17.

The body-frame is floored in rear of the middle transom $A^5$, but is preferably left open in front of said transom.

The upright shaft K has a notched wheel 6 fixed thereon, and a locking-lever 7 is provided which engages said notched wheel for retaining the shaft and parts operated thereby at positions of adjustment. This locking-lever 7 is made as indicated in Figs. 15 and 16, it being formed with a fulcrum projection 8, that hooks into an opening in the foot-plate 9, and thereby retains the lever in combination. A spring 10 is arranged under the outer end of the lever, which forces the front end thereof into the notches of the wheel 6. The operator by pressing his foot on the outer end of the lever compresses the spring and lifts the point from the notch of the wheel when he desires to shift the slide mechanism. The shaft C for shifting the rear axle B is provided with similar locking devices.

A tool-box 12 is arranged in the body between the adjusted shafts, the cover of which forms a part of the floor.

A seat 13 for the driver is supported by springs on the front end of the carrying-frame, as shown.

A bracket 14 is fixed to the front transom for holding the pole-supporting chain 15, the height of said bracket being sufficient to permit the chain to pass over the corners of the carrying-frame when the front wheels b' are swung under the front of the body in turning the machine.

The scraper D in some instances is made, as shown in Figs. 18 and 19, with a double plate or auxiliary blade D⁵, said auxiliary blade being longitudinally adjustable upon the primary blade D, which latter is provided with slots 16, through which holding-bolts 18 are arranged, having their heads countersunk in the auxiliary blade, and provided with nuts that screw up against the rear of the primary blade for holding the auxiliary blade in position. Clips 20 are arranged on the upper edge of the primary blade, which lock over the top edge of the auxiliary blade, as shown in Fig. 19, for retaining the two plates or blades in conjunction with each other. This auxiliary blade can be shifted endwise for giving extension at either the right or left of the scraper, as indicated by full lines and by dotted lines in Fig. 18.

It will be understood that we do not claim, broadly, the lateral shifting of a scraper in relation to its carriage, irrespective of the construction of the mechanism for accomplishing such result, as we are aware that road-machines have heretofore been made in which a lateral shift of the blade could be effected, but by means other than that herein described.

We are also aware that machines have heretofore been made having their scraper-adjusting mechanism mounted on a swinging beam.

We claim as our invention to be secured by Letters Patent—

1. In a machine for the purpose specified, having its body or carriage frame mounted on front and rear traveling wheels, the combination, with said carriage-frame and the scraper-blade, of a reach or draft-bar for sustaining the scraper, having its forward end confined and adjustable in a transverse slot in the front end of the carriage-frame, and its rear end confined by an eye on a laterally-movable supporter connected with the carriage-frame, whereby said reach is laterally adjustable in relation to said carriage-frame at both its front and rear ends, and fastenings for retaining the same at positions of adjustment, for the purpose set forth.

2. In a machine for the purpose specified, having a body or carrying frame supported at front and rear on wheels, the combination, with said body and the diagonal scraper, of a reach or scraper connecting-frame sustained at its ends beneath said body, and provided at an intermediate position in its length with a transverse hinge having a nominally horizontal axis, substantially as and for the purpose set forth.

3. In a machine for the purpose specified, the combination, with the diagonal scraper-blade and the body or carrying frame mounted on front and rear axles and wheels, of a reach or draft-bar, to which said scraper is attached, having its ends supported in connection with the body-frame and provided with a hinge in rear of the scraper attachment, to permit upward and downward movement of the scraper while the ends of said draft-bar remain at a given position in relation to the frame, and means, substantially as described, for raising and depressing the respective ends of the scraper, as set forth.

4. In a machine for the purpose specified, the combination of the carrying-frame mounted on front and rear axles and wheels, the reach having both of its ends pivotally sustained in connection with said carrying-frame and provided with a central horizontal hinge, the scraper connected to said reach by a pivoting-axis and provided with a semicircle D', the brace L and guides whereby the front of said semicircle is held in connection with said reach, a fastener or locking-bolt arranged thereon for confining the semicircle, and connections for operating said fastener or locking-bolt, substantially as set forth.

5. In a machine for the purpose specified, the combination of a carrying-frame mounted on wheels, an adjustable diagonal scraper having a semicircle atttached thereto, a reach-bar, to which said scraper is pivoted, having a hinge in rear of the scraper-pivot, its ends supported in connection with the carrying-frame and laterally adjustable thereon, a swing-beam pivoted on said carrying-frame, and hand-wheels and operating-gear mounted in bearings on said swing-beam, with connections and rods at the respective ends of the scraper for effecting adjustment of the same, all substantially as set forth.

6. In a machine for the purpose specified, the combination, with the scraper and its carrying-frame having a transverse slot at its forward end, of the reach or scraper draft-bar F, its forward end extending through and laterally adjustable in said slot and furnished with a head-plate g, and means for retaining the head of the reach at different positions of adjustment in relation to the carrying-frame, all substantially as and for the purpose set forth.

7. In a machine for the purpose specified, the combination, substantially as described, of the carrying-frame, the longitudinally-adjustable rear axle, the laterally-adjustable reach F, the diagonal scraper-blade pivotally connected to and adjustable with said reach, the traverse guide-bar J, the slide I, provided with a loop i, that supports the rear end of said reach, the hand-wheel shafts C and K, and connecting-gear for shifting said slide and rear axle, for the purpose set forth.

8. In a machine for the purpose specified, the combination of the carrying-frame mounted on front and rear wheels, the circular traverse-track V, fixed thereon, the diagonal adjustable scraper-blade, the laterally-adjustable reach supporting said scraper, the swing-beam R, centrally pivoted on the carrying-frame and supported on said traverse-circle V, the lifting-rods N, connecting the scraper with lifting-arms, and operating mechanism supported on said swing-beam for working said scraper, all combined substantially as and for the purposes set forth.

9. In a machine for the purpose specified, in combination with the diagonal adjustable scraper and its support, substantially as described, the guide-bar J, fixed to the carrying-frame, the slide I, mounted on said guide-bar, having a toothed rack and a dependent loop $i$, that embraces the tail end $F^2$ of the scraper-support, the pinion $k$, shaft K, hand-wheel K', locking-wheel 6, and lever 7, all arranged for operation, as and for the purpose set forth.

10. In a machine for the purpose specified, the combination, with the scraper-blade D, semicircle D', reach F, and brace L, of the locking-bolt M, its spring $m$, actuating cam-lever M', and handle-rod $M^2$, substantially as described.

11. In a machine for the purpose specified, the combination, with the swing-beam R, carrying the scraper-adjusting gearing, and the traverse-circle V, fixed to the carrying-frame, of the clamping-plate $n$, its cam-lever X, and connecting-bolt $n'$, substantially as and for the purpose set forth.

12. In a machine for the purpose specified, the combination, with the main carrying-frame and the laterally-adjustable reach or draft-bar, of the primary scraper-blade D, having the semicircle D', with downwardly-curved ends attached thereto pivotally connected for oblique adjustment, and the auxiliary scraper-blade $D^5$, arranged on said primary scraper-blade and attached thereto by clips 20, and detachable fastening-bolts 18, fitted in slots or openings 16 in said primary blade, said auxiliary blade being longitudinally adjustable for extension at the right or left of said primary blade, all substantially as shown and described.

13. In a machine for the purpose specified, the combination of a carrying-frame mounted on wheels, a diagonally and vertically adjustable scraper, a reach to which said scraper is connected supported by and laterally adjustable in relation to the carrying-frame at both its front and rear ends, a longitudinally-adjustable rear axle, hand-wheels and gearing mounted on the rear part of the carriage for effecting adjustment of said reach and axle, and means for holding the parts at different positions, substantially as set forth.

14. In a machine for the purpose specified, the combination, with the carrying-frame mounted on wheels, of the traverse-circle V, fixed on said frame, the laterally-adjustable reach, the scraper pivoted to said reach, and scraper-operating mechanism supported by a carrier or swing-beam that moves on said traverse-circle, substantially as set forth.

Witness our hands this 1st day of April, A. D. 1889.

GEORGE WARNER TAFT.
ELIAS L. LATHROP.

Witnesses:
THEO. D. HADLEY,
CHAS. C. HADLEY.